United States Patent

[11] 3,600,755

| [72] | Inventor | Francis W. Cook, Jr.<br>Newington, Conn. |
|---|---|---|
| [21] | Appl. No. | 824,845 |
| [22] | Filed | May 15, 1969 |
| [45] | Patented | Aug. 24, 1971 |
| [73] | Assignee | The New Britain Machine Company<br>New Britain, Conn. |

[54] PLASTIC INJECTION-MOLDING MACHINE WITH VARIABLE SPRUE-HEIGHT ADJUSTMENT
4 Claims, 4 Drawing Figs.

| [52] | U.S. Cl. | 18/30 JA |
|---|---|---|
| [51] | Int. Cl. | B29f 1/00 |
| [50] | Field of Search | 18/30 PS, 30 JA |

[56] References Cited
UNITED STATES PATENTS

| 3,425,095 | 2/1969 | Kotek | 18/30 JA UX |
|---|---|---|---|
| 3,464,091 | 9/1969 | Bielfeldt | 18/30 PS |

FOREIGN PATENTS

| 960,308 | 6/1964 | Great Britain | 18/30 JA |
|---|---|---|---|
| 428,194 | 1/1967 | Switzerland | 18/30 JA |

*Primary Examiner*—J. Spencer Overholser
*Assistant Examiner*—Michael O. Sutton
*Attorneys*—Robert S. Smith, David S. Urey, Alan C. Rose and Alfred B. Levine ABSTRACT: In a plastics injection-molding machine, the injector is reciprocatably slidable on a platform for engaging the injector nozzle with the sprue hole of a mold on the machine. One end of the platform is pivoted for jacked vertical movement of the other end, to adjust the vertical position of the injector nozzle. Such adjustment accommodates the injector nozzle to the elevation of the sprue hole, for successive molds having sprue holes at different heights. The portion of the nozzle engaging the sprue hole is generally spherical for making universally good contact therewith, throughout the range of adjustably available angular positions of the injector relative to the mold.

Patented Aug. 24, 1971 3,600,755

INVENTOR
FRANCIS W. COOK, JR.
BY
Sandoe, Hopgood & Calimafde
ATTORNEYS

Patented Aug. 24, 1971
3,600,755
2 Sheets-Sheet 2
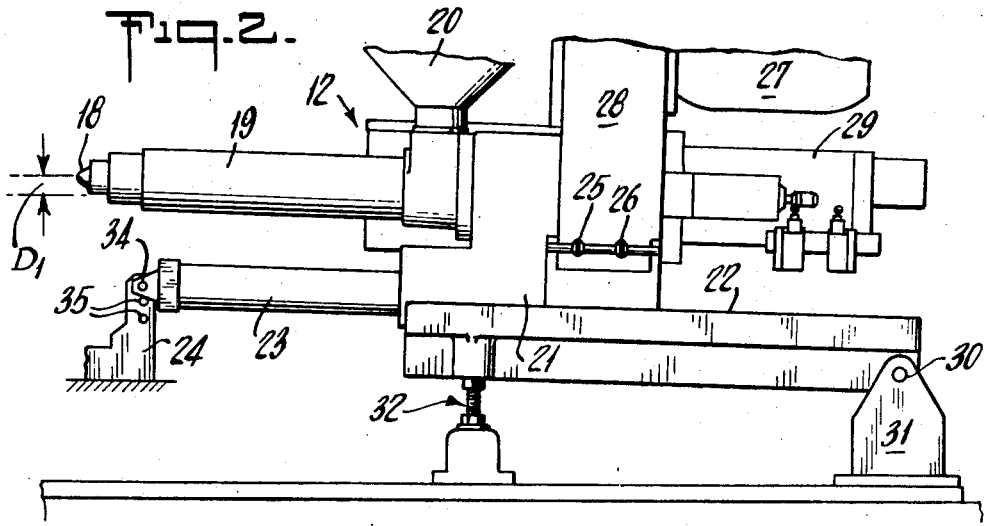
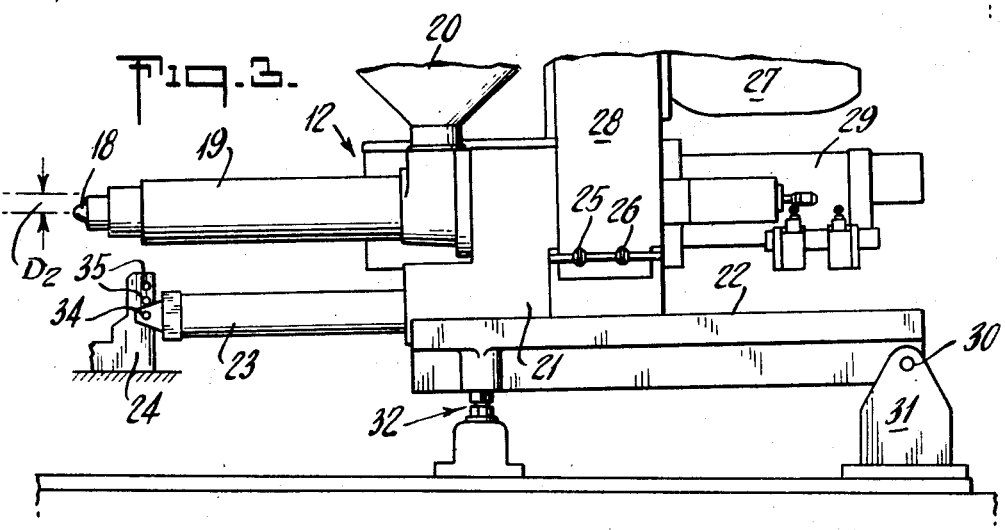
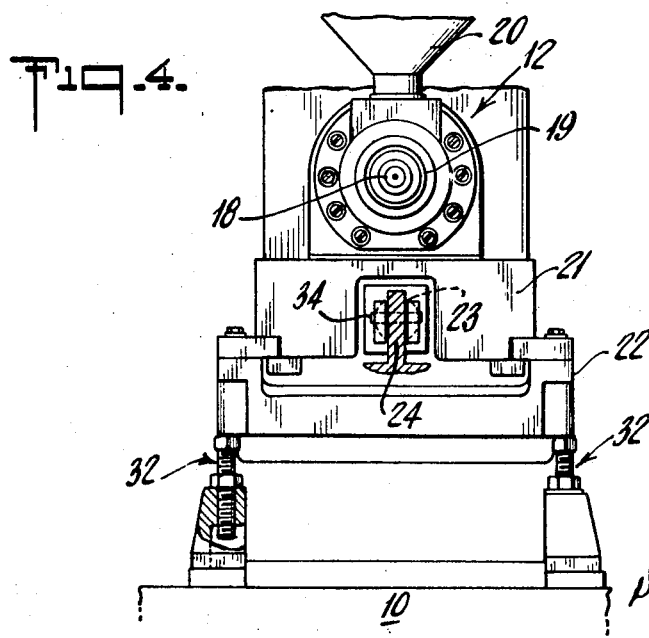
INVENTOR
FRANCIS W. COOK, JR.
BY
Sandoe, Hapgood & Calimafde
ATTORNEYS

PLASTIC INJECTION-MOLDING MACHINE WITH VARIABLE SPRUE-HEIGHT ADJUSTMENT

The present invention relates to plastics injection-molding machines, and particularly to such a machine in which the vertical position of the injector nozzle, from which plastic is injected into a mold, is variably adjustable relative to the vertical position of the sprue hole of the particular mold which is selected for use with the machine.

In the type of plastics injection-molding machines with which this invention is concerned, plastic and any additional material, such as plasticizers and coloring, are fed from a hopper into an elongated injector, which may include plasticizing means of the reciprocating screw variety. In such an injector, the plasticizing action results from rotation of the screw, with resulting forward displacement of plasticized material or melt toward the end of the injector. After the time required to generate a melt accumulation of at least the "shot" size, injection pressure is applied to displace the screw, which then acts as a piston to discharge the shot of plasticized melt into a mold, via nozzle engagement at the sprue hole of the mold. After sufficiently curing the molded element and generating a new melt accumulation, the injector may be retracted from the mold to disengage the injector nozzle from the mold, and thus to permit the molded element and a part of the mold to be moved out of the way. Mold parts defining the next mold cavity are then placed in position to be engaged by the injector nozzle for the next successive molding operation. The retraction of the nozzle (to permit mold movement) is one stroke of a reciprocation cycle for the injector; the return stroke occurs when the next mold cavity is defined and positioned for a molding operation.

The type of mold generally used with machines of the character indicated employs separable parts which are vertically divided or are otherwise so devised that the sprue opening, which must receive melt discharge from the injection nozzle, is set up to be in axial alignment with the nozzle-injection axis, the latter being a fixed and invariable alignment. Obviously, it is time consuming to adapt to the same machine the different molds with variously located sprue holes.

It is an object of the present invention to provide an improved machine of the character indicated with means rendering the machine itself more flexibly adaptable for use with molds having variously located sprue holes, i.e. at different elevations.

A specific object is to meet the foregoing object with a construction in which a simple elevating adjustment adapts the injection nozzle universally to a range of tolerable sprue elevations, for different successive molds used with the machine.

Another specific object is to provide for ready adaptability of injector-reciprocating mechanism, as nozzle elevation adjustments are made in such a machine.

Still another object is to realize the foregoing objects with maximum utilization of existing components and with minimum cost and complexity as to new components.

It is in general an object to meet the above objects with mechanism of such simplicity and reliability that a given machine may, in a single working shift if desired, make several production runs on different molds having various sprue hole elevations.

Other objects and various further features of novelty and invention will become apparent or will occur to those skilled in the art from a reading of the following specification, in conjunction with the accompanying drawings. In said drawings, which show, for illustrative purposes only, a preferred form of the invention:

FIGS. 2 and 3 are further simplified fragmentary views similar to FIG. 1 but showing the parts in relatively raised and lowered adjustment positions, respectively; and FIG. 4 is a fragmentary front-end view of the machine, in the adjusted relation of FIG. 1.

Figure 1:
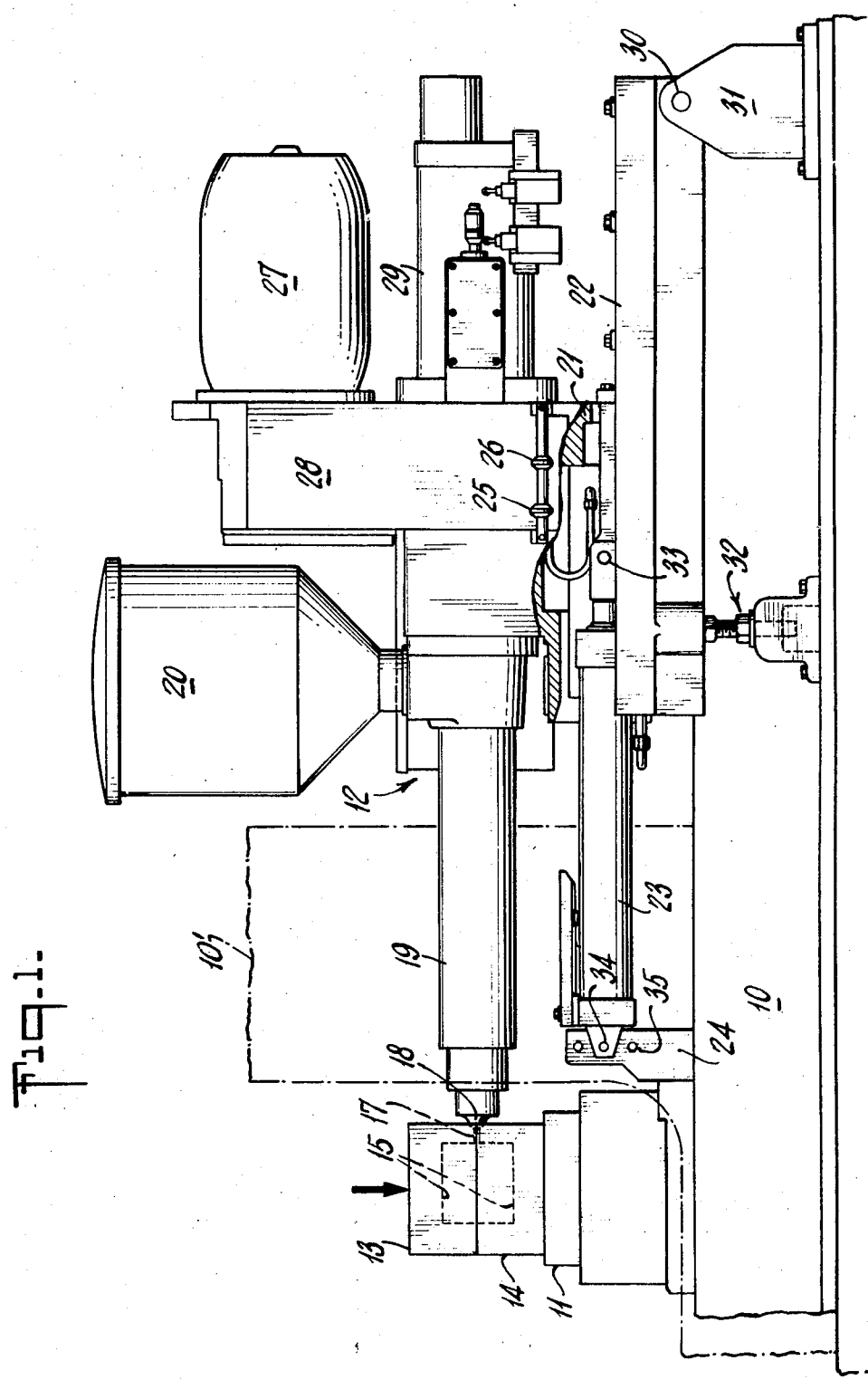
FIG. 1 is a simplified side view in elevation of a plastics injection-molding machine incorporating the vertical-adjusting means of the invention, showing an intermediate position of adjustment.

Briefly stated, the invention contemplates employment of a frame-based platform or intermediate support for the complete injector mechanism, including its plasticizing means. The injector mechanism is reciprocatably guided on the support, and simple jacking means adjustably elevates the support to position the injection nozzle as needed for variously elevated sprue holes.

Referring to the drawings, an elongated frame or bed 10 positions means 11 for the support of a mold to be injected with plasticized melt, supplied by injection mechanism which is generally designated 12. The mold is shown to be of the variety employing upper and lower halves 13, 14, defining an internal cavity 15 to be filled. The mold halves 13, 14 are separable at a parting line 16 which is generally horizontal, and at the end facing the mechanism 12, a sprue passage 17 is defined, for external engagement with the discharge nozzle 18 of mechanism 12. The upright phantom outline 10' suggests frame members to carry mold clamp mechanism (not shown) but operative to apply downward clamp pressure to mold part 13, as suggested by a heavy arrow.

As generally indicated, the injection mechanism 12 may be of the so-called rotary reciprocating screw variety. Thus, an elongated barrel 19 accommodates a screw (not shown) having threads to convey plastics material received from a gravity supply or hopper 20. The base 21 of the injection mechanism is longitudinally guided in suitable ways on a support 22 which, in turn, is carried by the frame 10. Actuating means such as a double-acting hydraulic device 23 is connected between the base 21 aNd a part 24 of the frame 10 to impart longitudinal reciprocating displacement to the injection mechanism on its support 22; such actuation is normally between the nozzle-engaged or forward position shown in FIG. 1, and a retracted position in which nozzle 18 clears the mold, to enable removal of the mold (or of mold elements) for extraction of molded products. Adjustably positioned stop elements 25, 26, carried by the base 21 enable a limit switch (not shown) on support 22 to determine selected limits of such reciprocation.

During a normal operation of the machine, and assuming a filled cavity 15, melt for the next "shot" is generated and accumulated behind nozzle 18 and forward of the screw, as the screw is rotated by a motor 27 and suitable reduction gearing at 28. As rotation proceeds, forwardly directed loading pressure on the screw is maintained by hydraulic means 29, thus increasing the masticating efficacy of screw action on the material supplied from hopper 20. Accumulating melt forces screw retraction until lapse of an interval adequate to generate at least the melt volume needed for the next shot, whereupon the motor 27 is stopped and hydraulic loading pressure relieved at 29. The described retraction, mold and finished-part removal, and return stroke of actuator 23 then proceed; and after the newly presented mold cavity is positioned and clamped, the next shot is made, when elevated actuating pressure at 29 forces the screw to its forward position. The described cycle then repeats.

To accommodate the described machine to sprue elevations which may be above or below that shown in FIG. 1, the invention provides a simple elevation adjustment feature for the support 22. In the form shown, this involves pivoted connection of support 22 at 30 to frame-based trunnion means 31, preferably at a location longitudinally remote from the nozzle location, and jackscrew means 32 at the forward end of support 22 adjustably elevates the position of nozzle 18. Means 31 will be understood to designate laterally spaced trunnions straddling the vertical plane of the injection axis, for firm frame reference, and similar spacing of jack screws 32 appears in end view of FIG. 4. The placement of jacks 32 provides ready wrench access whenever elevation adjustment is needed.

As a feature of the invention, the actuating means 23 which governs horizontal reciprocation of mechanism 12 is substantially aligned with the elevation and direction of guided support for base 21 in means 22, and this applies for a range of elevation adjustments. As shown, the actuator is articulated in its connection 33 to the base 21 and in its connection 34 to the frame pedestal 24; and depending upon the selected elevation, the pin 34 which provides the frame reference may be engaged at a selected one of several points, as at 35, in order to achieve substantial conformance in the alignment of reciprocating force with the direction of guided support for base 21.

FIG. 2 illustrates an upwardly elevated adjustment at jacks 32, whereby the nozzle 18 has been positioned a distance $D_1$, above the position of FIG. 1 and it will be seen that a more elevated selection of frame reference 34 has achieved the desired adjustment of reciprocating thrust alignment. For nozzle elevations less than the distance $D_1$, it may not be necessary to reposition the pin connection 34.

FIG. 3 illustrates a downwardly positioned adjustment at jacks 32, whereby nozzle 18 has been depressed a distance $D_2$ below the position of FIG. 1. Again, the repositioning of pin 34 has retained the desired reciprocating thrust alignment.

When the injection mechanism 12 is raised or lowered from a median horizontal position, the angular relation of the engagement of the nozzle 18 with the sprue hole 17 changes accordingly. The sprue hole 17 is conventionally circular and may have a flared mouth adapted to the nozzle contour. To assure a tight universal engagement of the nozzle 18 with the sprue hole 17 around the complete circumference of the sprue hold 17, the end portion of the nozzle 18 is shaped to be generally spherical, and the mouth of the sprue hole is preferably concave spherical and is truncated short of hemispherical, in view of the range of angularity with which it is to be engageable by nozzle 18.

The invention will be seen to provide substantially enhanced setup flexibility and convenience for a variety of types of injection-molding machines. In particular, a given machine is thereby rendered adaptable to a substantial range of mold types and sprue hole elevations, with simple adjustments that take only minutes to establish.

While the invention has been described in detail for a preferred form, it will be understood that modifications may be made without departing from the scope of the invention as defined in the claims.

I claim:

1. In a plastics injection-molding machine, a horizontally elongated frame including means for supporting a mold having a circular sprue hole at one side, injection means and a generally horizontally elongated support therefor carried by said frame, said injection means including means for accumulation of plasticized melt and a generally horizontally directed discharge nozzle facing the sprue hole side of the mold, elongated guide means coacting between said injection means and said support for generally horizontal reciprocating movement of said injection means, jack means coacting between said frame and said support for selective elevation of the discharge axis of said nozzle, and actuating means reacting between longitudinally spaced locations respectively on said frame and on said injection means for driven reciprocation of said injection means into and out of a sprue engaging position for said nozzle, said actuating means comprising a double-acting hydraulic actuator with articulating end connections to said frame and to said injection means, respectively.

2. The machine of claim 1, in which the operative axis of said hydraulic actuator and the articulating end connections thereof are on substantially the alignment and elevation of the axis of guided support of said injection means.

3. The machine of claim 2, wherein said support is pivoted to said frame at a location longitudinally remote from the injection nozzle and wherein said jack means is longitudinally intermediate such pivotal support and the nozzle location.

4. The machine of claim 3, wherein the connection of said actuator to said frame includes a removable pin, and selectively available vertically spaced coating pin-receiving means at the location of actuator-frame connection for selective elevation of the point of frame-actuator connection.